Dec. 6, 1927.

G. TER MEER

CENTRIFUGAL SEPARATOR

Filed Nov. 10, 1925

1,651,421

Inventor
Gustav ter Meer
By his Attorney

Patented Dec. 6, 1927.

1,651,421

UNITED STATES PATENT OFFICE.

GUSTAV ter MEER, OF HANOVER-LINDEN, GERMANY.

CENTRIFUGAL SEPARATOR.

Application filed November 10, 1925, Serial No. 68,064, and in Germany March 12, 1925.

This invention relates to certain improvements in the type of centrifugal separator disclosed and broadly claimed in my prior Patent 1,160,635, issued November 16th, 1915. In the construction there illustrated the peripheral wall and the floor or bottom wall are relatively movable axially so that the solid material collected in the separator may be discharged radially across an open space above the upper edge of the peripheral wall.

To use this construction with centrifugal separators having the peripheral wall of the drum constituting or including a sieve or filtering medium has heretofore been considered impractical. Furthermore, in the treatment of certain materials in centrifugal separators of the type in which the peripheral wall constitutes the sieve or filter, there is a considerable loss when the material is first led into the drum, due to the fact that the finer particles pass through the sieve or filtering medium until a layer of solid particles has been deposited to act as a further filtering layer.

The main object of my invention is to adapt the sieve drum type of separator for the discharge of the solid materials in accordance with my prior patent above referred to, and at the same time better adapt the sieve drum type of separator for the treatment of fine materials.

In carrying out my invention I make the sieve drum wall with a larger inside diameter than the outside diameter of the floor or bottom wall. Thus when one of these walls is moved axially in respect to the other, the main body of the solid material in the drum is discharged but a layer of a thickness equal to the difference in said diameters is left in contact with the inner surface of the sieve so as to act as a filtering medium for the material thereafter delivered to the drum. By means of this novel construction it will be noted that the sieve is out of contact with and is not scraped or injured by the scraper during the relative axial movement, and the considerable loss of fine material ordinarily occurring during the beginning of each filtering or separating action is avoided.

Figure 1:
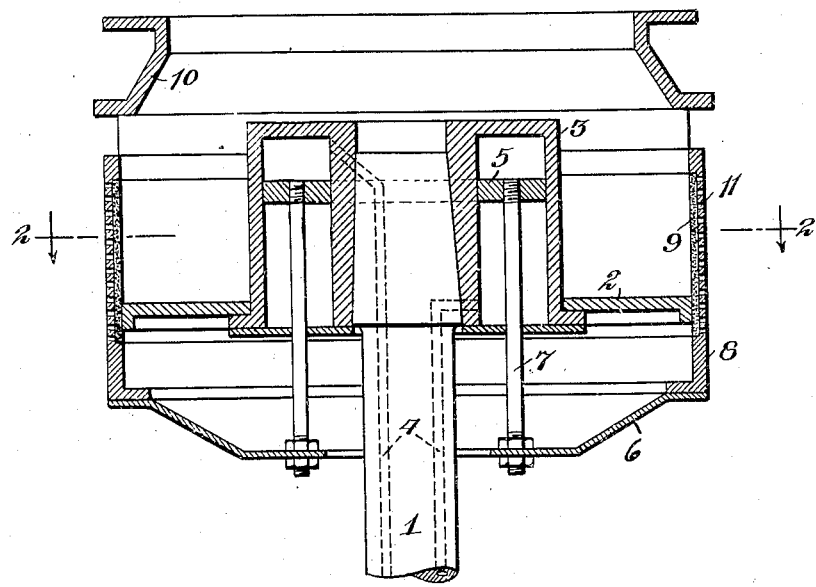
Figure 2:
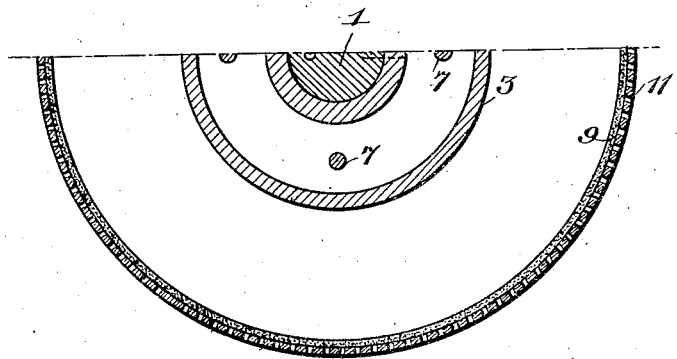

In the accompanying drawings:

Fig. 1 is a central longitudinal section showing the sieve drum or peripheral wall partially lowered, and Fig. 2 is a transverse section on the line 2—2 of Fig. 1.

In the construction illustrated in the accompanying drawings the main vertical shaft 1 has a central cap or head 3 which is connected to the floor or bottom wall 2 of the separating chamber. In the cap 3 there is an annular cylinder having an annular piston 5 which is connected by piston rods 7 and brackets, arms, or flanges 6, to the peripheral wall 8 of the drum. The shaft 1 has passages 4 therethrough, one connected to one end of the annular cylinder and the other to the other end, whereby fluid under pressure may be delivered to either end of the cylinder for raising or lowering the peripheral wall 8. The bottom wall 2 is connected by any suitable means (not shown) to an annular top wall 10 through the central opening of which the material to be separated is delivered.

In my improved construction the peripheral wall 8 includes a sieve or reticulated filtering wall 11 having an inside diameter larger than the outside diameter of the bottom wall or floor 2. Thus when the peripheral wall is moved downward axially the bottom wall 2 is out of contact with the sieve wall 11 and will leave a layer 9 of the fine sludge or separated material in contact with the sieve wall. As above pointed out, this protects the sieve from any direct contact with the bottom and forms a filtering layer through which the material is delivered during recharging of the drum. The lower portion of the peripheral wall 8 is preferably made to have a snug fit with the periphery of the bottom 2, so that leakage of material is prevented when the peripheral wall is in raised position.

During the normal operation, the bottom wall 2 is pressed firmly against the seat at the lower edge of the wall 8 so as to form a substantially water-tight connection and the upper edge of the wall 8 is also pressed against the seat at the lower edge of the top wall 10. The material is admitted to the top of the chamber, and the coarser particles collect on the reticulated wall or screen 11. These coarser particles tend to stop the finer particles until a layer 9 is built up which acts as a filter-bed and prevents the further passage of fine particles but permits the outflow of the liquid therethrough. When the chamber is substantially filled with solid material the peripheral wall 8 is lowered to permit the radial discharge of the solid matter between the walls 2 and 10, but in lowering it, the wall 2 does not scrape off all of the material from the screen. Enough of the fine material is left on the screen so as to act as the initial portion of the filter bed for the next filling operation.

Having thus described my invention, what I claim as new and desire to secure by Letters Patent is:—

A centrifugal separator including spaced top and bottom walls, a peripheral wall axially movable and adapted to seat against said top wall and to have a tight-fit with said bottom wall, said peripheral wall having a screen intermediate of its upper and lower edges, and of slightly larger inside diameter than said bottom wall, and means for moving the peripheral wall downward axially to permit the radial discharge of the material within the separator but to leave a layer of said material against said screen whereby during each operation the separating action is effected by the layer of previously separated material.

Signed at Hamburg, Germany, this 23rd day of October, A. D. 1925.

GUSTAV ter MEER.